United States Patent [19]
Hewitt et al.

[11] Patent Number: 5,158,677
[45] Date of Patent: Oct. 27, 1992

[54] MACHINE COOLANT RECLAMATION APPARATUS

[76] Inventors: Robert M. Hewitt, Rte. 6 Box 554, Statesville, N.C. 28677; Hugh D. Martin, 200 Bruton Pl., Spartanburg, S.C. 29302

[21] Appl. No.: 764,498

[22] Filed: Sep. 20, 1991

[51] Int. Cl.$^5$ .............................................. C02F 1/40
[52] U.S. Cl. ................................... 210/202; 210/299; 210/319; 210/360.1; 210/776; 210/805
[58] Field of Search ............... 210/202, 294, 295, 299, 210/319, 360.1, 448, 482, 776, 787, 804, 805, 800, 806, DIG. 5, 198.1

[56] References Cited

U.S. PATENT DOCUMENTS

| | | | |
|---|---|---|---|
| 4,361,488 | 11/1982 | White et al. | 210/805 |
| 4,366,069 | 12/1982 | Dudrey et al. | 210/776 |
| 4,431,540 | 2/1984 | Budzich | 210/360.1 |
| 4,521,313 | 6/1985 | Wolde-Michael | 210/776 |
| 4,636,317 | 1/1987 | Lewis | 210/787 |
| 4,722,792 | 2/1988 | Migagi et al. | 210/360.1 |
| 4,772,402 | 9/1988 | Love | 210/805 |
| 4,773,992 | 9/1988 | Dietrick et al. | 210/295 |

Primary Examiner—Mary Lynn Theisen
Assistant Examiner—David Reifsnyder
Attorney, Agent, or Firm—Michael A. Mann

[57] ABSTRACT

Apparatus for reconditioning water-based, synthetic and semi-synthetic coolants. The apparatus comprises a stainless steel mesh filter for removing larger particulate, a coalescer to agglomerate oil droplets and enable a disk skimmer to remove and transfer the separated oil to an oil reservoir, and an inverted, coolant-driven centrifugal separator to separate the smaller particulate down to one micron or smaller in size. Part of the cleaned coolant is combined with the partially cleaned coolant to enable multiple passes of the coolant to assure removal of the particulate. The coolant is pumped using two double-diaphragm air pumps for best control of flow rate and pressure and for good suction for the size of the pump. A biocide may optionally be added to stabilize the coolant. In addition to being able to separate particulate, the separator has sufficient thrust to partially separate the constituents of the coolant as well. These constituents are recombined, emulsified, by issuing them from the separator through jet nozzles.

19 Claims, 2 Drawing Sheets

MACHINE COOLANT RECLAMATION APPARATUS

BACKGROUND OF THE INVENTION

1. Field of the Invention

The present invention relates to the cleaning and reclamation of machinery coolants. More particularly, the present invention is a method and apparatus for removing of metal fines and tramp oils from used synthetic and semi-synthetic coolant for recycle.

2. Discussion of Background

In metalworking various water-based, synthetic and semi-synthetic coolants are used to remove the heat generated by the performance of mechanical work on a metal piece, the "work piece". Metal working includes drilling, turning, drawings, forming, sawing, grinding, milling, tapping, threading, honing, broaching and other operations. Synthetic and semi-synthetic coolants are water-based lubricants that usually contain no petroleum oils but, rather, non-petroleum additives such as polyalkylene glycols. The synthetic coolants may contain other ingredients such as anti-foaming agents, rust inhibitors, biocides and extreme-pressure inhibitors.

As a result of these operations, the coolants become contaminated with metal fines and "tramp oils", from machine hydraulic fluids finding their way into the coolant stream. When the levels of fines and tramp oils become high enough, the coolant will no longer adequately serve its intended purpose and must be disposed of or cleaned.

Various devices exist to clean coolant. Many of these include cannisters containing a filter medium or bag filters. Some include settling tanks or ponds to allow heavier particulate to settle out. These devices are slow, inefficient and result in material other than the fines alone that will require disposal, such as the filter media.

Disposal of contaminated metalworking fluids is not a simple nor inexpensive matter. These fluids are hazardous and special disposal techniques are mandated by law to provide suitable long term storage or treatment so that the hazards of these fluids remain separated from the environment. Attendant with the physical disposal requirements are requirements for record-keeping and chemical analysis. Consequently, reduction of the volume of waste has become a goal of metalworking facilities to reduce disposal costs. Ideally, coolants would be repeatedly reclaimable or reconditionable for reuse and the fines and tramp oils separable so that no coolant is lost in the process of reclaiming and the quantities of fines and tramp oils remaining in the cleaned coolant would be negligible.

Several attempts have been made to provide devices for cleaning and reclamation of coolants. A portable apparatus is described by Love in U.S. Pat. No. 4,772,402. His apparatus includes two centrifugal pumps and an accumulator reservoir. The first pump draws coolant from the machine, discharging it into a coarse filter in the reservoir. The second centrifugal pump draws coolant from the reservoir, forces it through a fine filter, preferably containing activated charcoal, and then discharges it into the machine coolant system.

In U.S. Pat. No. 4,636,317, Lewis describes a somewhat different system for processing coolants. Lewis employs a high speed disk-bowl centrifuge in combination with hydrocyclone centrifugation to remove contaminants from oil-and water-based coolants. Wolde-Michael describes a multi-step process including, settling, skimming, centrifuging, and recirculating.

No apparatus in these references disclose a device that has the characteristics of the ideal reclamation system. None removes particulate of submicron size in a portable unit with minimum disposable volume per gallon of coolant processed.

SUMMARY OF THE INVENTION

According to its major aspects and broadly stated, the present invention is a portable apparatus for cleaning water-based coolant, including both synthetic and semi-synthetic coolants. The apparatus removes tramp oils and metal fines from coolants in three major steps: filtering larger particulate with a mesh filter, removing tramp oils by agglomerating oil droplets and skimming the agglomerated droplets, and then removing the finer particulate using one or more high-speed, fluid-driven, inverted centrifugal separators that each has sufficient thrust to separate the metal fines, in fact sufficient thrust to partially separate the constituents of the coolant but not enough to create significant turbulence in the separator. However, the partially separated coolant recombines, or emulsifies, on exit when passed through jet nozzles. The coolant is fed to the filter and to the separators by double diaphragm air pumps. Additionally, the coolant may be injected with a stabilizer to limit the growth of bacteria in any remaining oil or new oil that might enter the coolant after it leaves the apparatus.

The centrifugal separators are an important feature of the invention. These separators are driven by the force of the coolant flow, which results from carefully preselected and regulated flow rates and pressures maintained by one of the two double-diaphragm pumps feeding into the separators, and causes the separation of the fines from the coolant without the use of filter cartridges or other mechanical devices that require disposal or might restrict flow through the separator. The filtrate simply collects in the form of a "cake" on the inside wall of the separator shroud from which it is periodically removed. This filtrate is the bulk of the material to be disposed of, as opposed to other systems where volumes of waste oils with concentrated metals are to be disposed.

The separators turn with sufficient thrust that, not only do they separate fines down to one micron in size, but they also partially separate the coolant into its constituents. This level of thrust is necessary to remove the smallest metal fines, but the thrust should not be so great as to cause turbulence. Importantly, the use of jet nozzles to emulsify the partially separated coolant and restore it to usable form enables the high speed separation to take place.

Another important feature of the present invention is the choice of components. The filter is preferably a mesh filer such as a stainless steel mesh filter; the agglomerator is preferably an angular-cut, polymeric coalescer; the skimmer is preferably a disk skimmer; the centrifuging means is preferably centrifugal separator rather than a cartridge of bag filter. These components are the type that can be cleaned or backwashed. Therefore, the quantity of material to be disposed of is reduced and no supplies need be inventoried for use of the apparatus.

Still another feature of the present invention is the use of double diaphragm air pumps. These types of pumps allow the flow rate to be controlled as precisely as needed and deliver more suction per unit size than gear or centrifugal pumps. Furthermore, except for the optional stabilizer, no source of electrical power is required to run the apparatus. Since service air is readily available at machining facilities but electricity is not always so available, this advantage makes the present apparatus especially convenient since no auxilliary power source is needed.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 2:
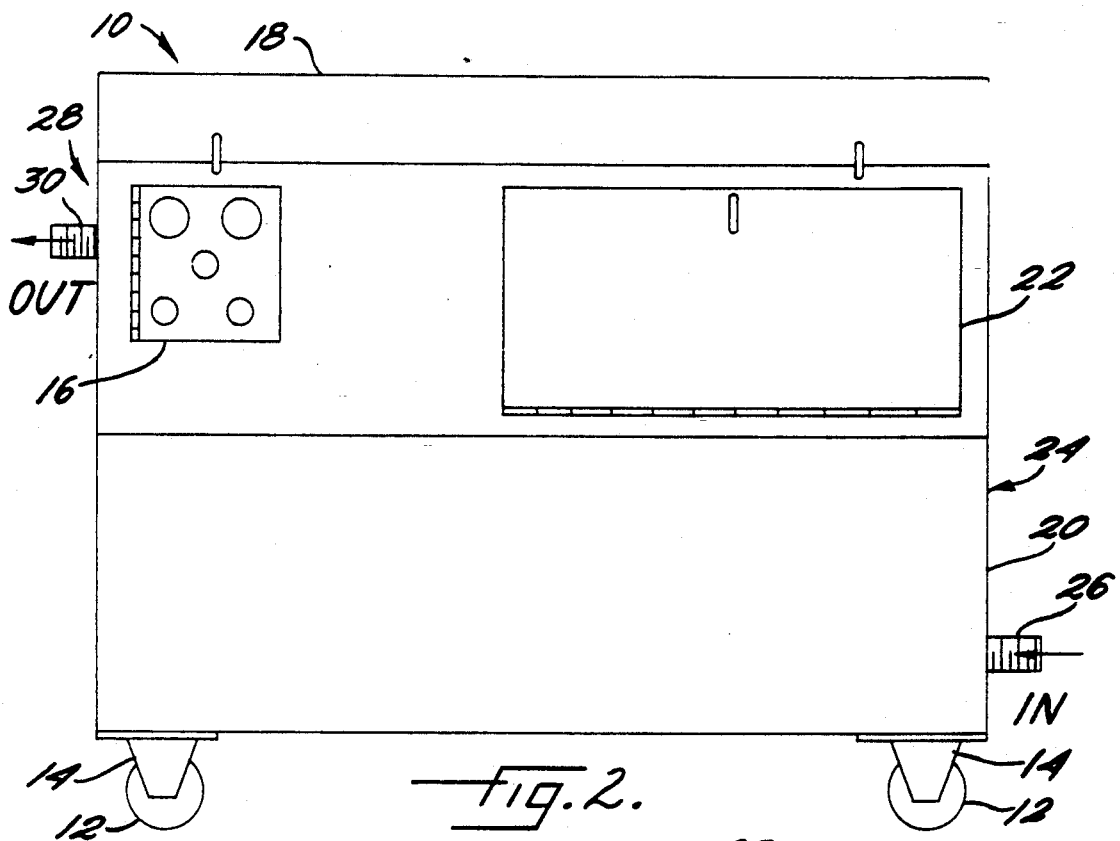
FIG. 2 is an exterior, side view of the apparatus of FIG. 1.
Figure 1:
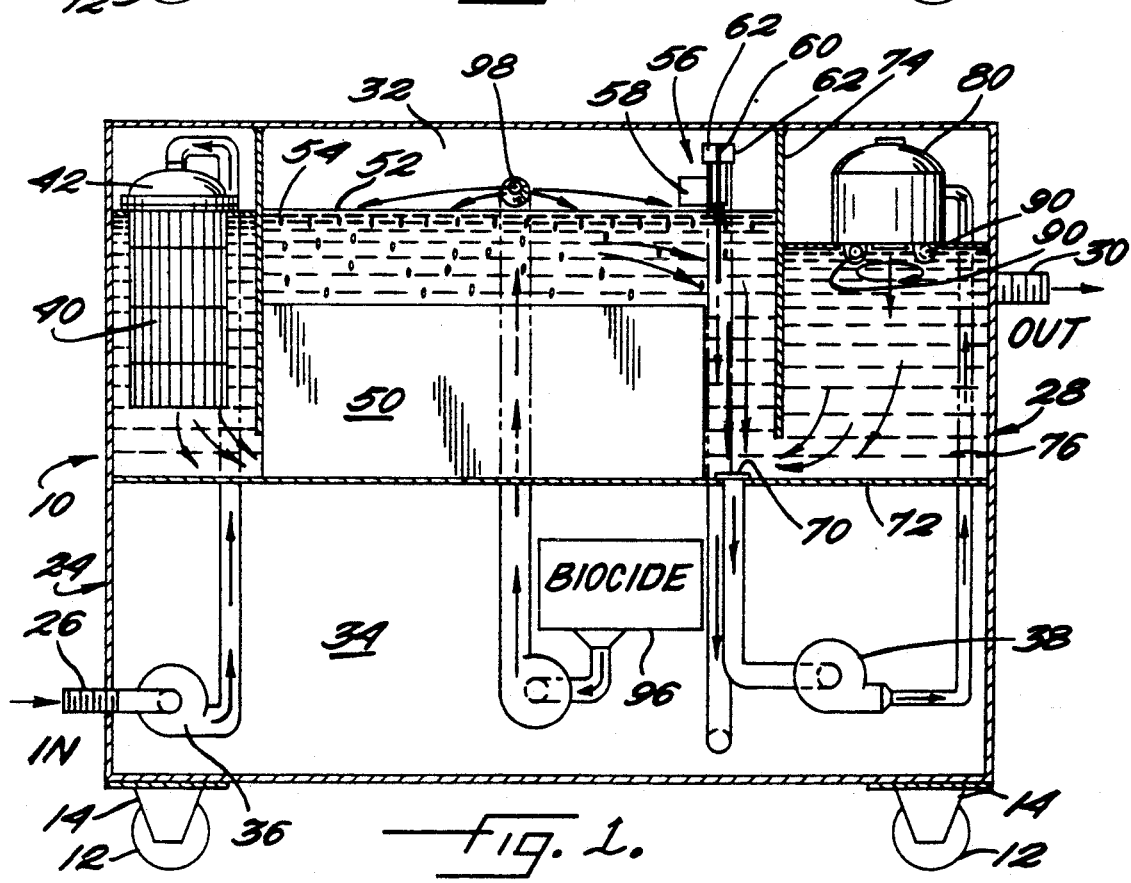
FIG. 1 is a cut-away, side view of an apparatus according to a preferred embodiment of the present invention.

Referring now to FIGS. 1 and 2, there is shown a side view of an apparatus according to the present invention, generally indicated by the reference numeral 10, with the covering panel removed in FIG. 1 to show the various components therein. Apparatus 10 is preferably in the form of a cabinet made of sheet metal attached to a simple frame that supports the components. Apparatus is portable and preferably mobile, being provided with wheels 12 in brackets 14. It has a simple control panel 16 and provision is made for access to the interior at the top 18 and the bottom 20. Moreover, storage space 22 is also provided for a test kit.

At one end 24 of apparatus 10 in an inlet 26; at a second, opposing end 28, an outlet 30. Inlet 26 is lower than outlet 30, preferably by approximately 30 centimeters, to eliminate the need for floats and pressure switches. Coolant flows from inlet 26 to outlet 30 through a series of stages which will be described in turn.

Interior to apparatus 10, there are two chambers, an upper chamber 32 that serves largely as a tank to contain the coolant, and a lower chamber 34 to house a first and a second pump 36 and 38, respectively. Pumps 36, 38, are preferably both double diaphragm air pumps, which deliver more suction than larger gear or centrifugal pumps. Therefore, diaphragm pumps will save space and weight in a portable, mobile apparatus 10.

The coolant to be cleaned may have particulate such as metal fines or lint of varying sizes and tramp oils. Metal fines must be removed to prevent gradual damage to machinery; tramp oils enable bacteria to breed and become rancid and odoriferous. Coolant enters inlet 26 and is pumped by pump 36 to a filter 40 through a manifold 42. Filter 40 will preferably filter larger particulate, such as that 200 microns in size or larger. Smaller sized filters can be used as long as they do not restrict flow. Although bag filters and cartridge filters may be used for this purpose, a mesh filter is preferred, and most preferably a stainless steel mesh filter, because it can be cleaned of particulate from time to time by backflushing. Therefore, there is no filter media to be disposed of.

After filtration, the coolant passes into the bottom of a coalescer 50, to agglomerate the tramp oils so that they float to the surface 52 of coolant. Coalescer 50 is preferably an angular-cut, polymeric coalescer, which, because of its polymeric composition, tends to cause oil to cling and, because of its angular cut, causes the oil droplets to agglomerate quickly and completely. To some extent this type of coalescer acts as a filter of oil and some particulate and can periodically be cleaned by flushing.

Figure 3:
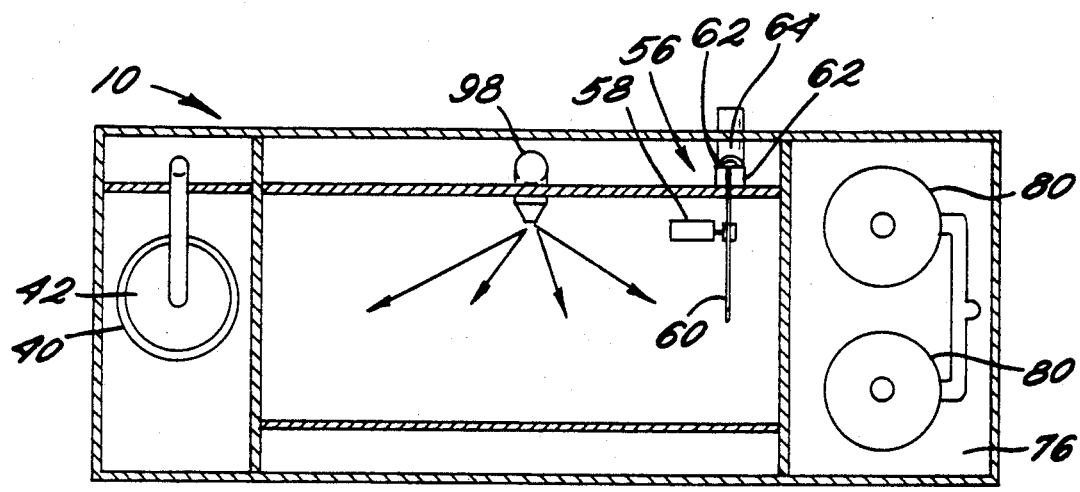
FIG. 3 is a top view of the apparatus as shown in FIG. 1.

Floating oil 54 is picked up by a skimmer, preferably a disk-type skimmer 56 with a motor 58 that drives a disk 60 which picks up oil 54 and transfers it with the aid of wiper blades 62 to a reservoir 64 (see FIG. 3) which can be periodically drained. A sight glass (not shown) can be incorporated into the side of reservoir 64 to facilitate the timing of the accumulated oil. It is not essential that a skimmer 56 be included with apparatus 10 as long as any tramp oil be removed eventually. If there is a relatively steady infusion of tramp oils into coolant during machining operations, however, it is preferred to have skimmer 56 removed the separated oil. Other skimmers such as drum skimmers and weirs, as are well known in the art, may be substituted for disk skimmer 56.

Second pump 38 sucks coolant into a pump inlet 70 mounted in the floor 72 of upper chamber 32, passes a separator wall 74 separating the coalescer from the centrifugal pumps (to be described below) and a cleaned coolant compartment 76. Separator wall 74 does not extend all the way to floor 72 so that some clean or conditioned coolant will be drawn from clean coolant compartment 76 and mix with the partially-cleaned coolant from the coalescing operation.

Figure 4:
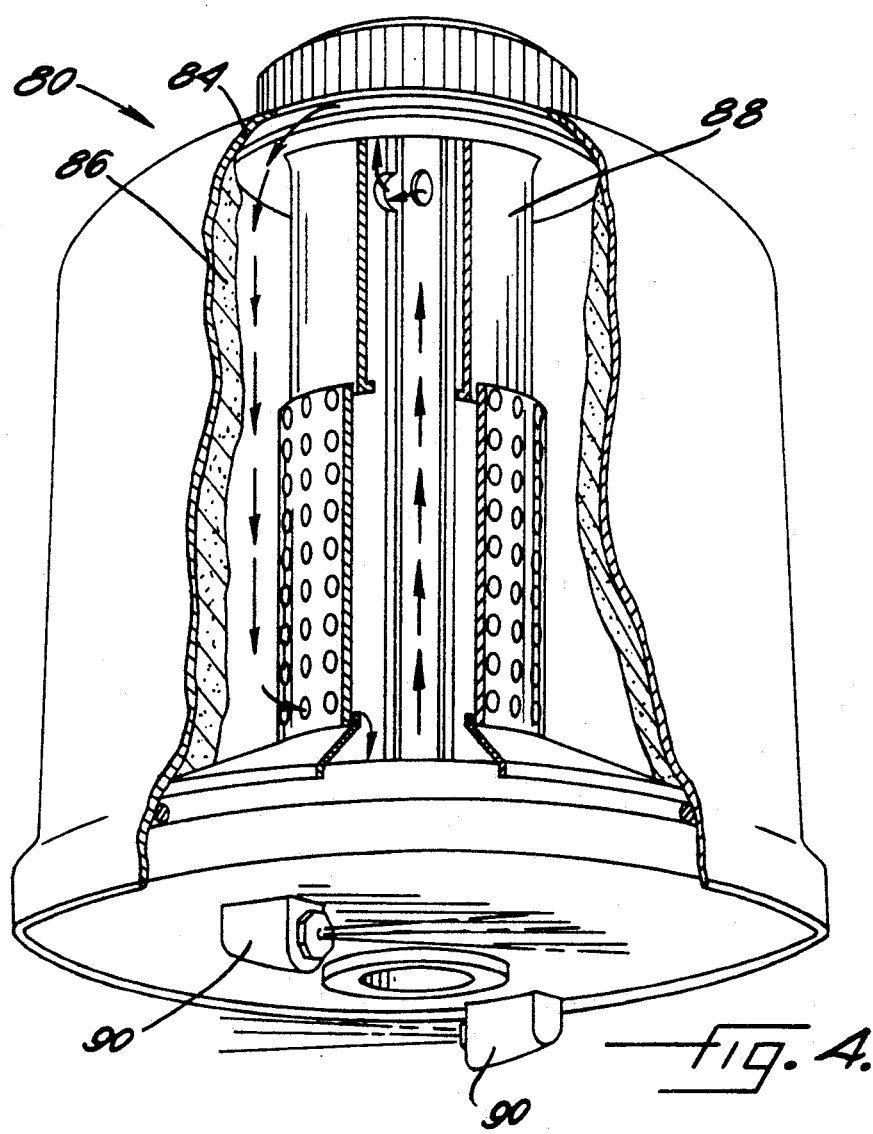
FIG. 4 is a perspective, partially cut-away view of the centrifugal separator according to a preferred embodiment of the present invention.

Second diaphragm pump 38 pumps coolant at a preselected flow rate and preselected pressure to one or more centrifugal separators 80, preferably two to four centrifugal separators, which separate the smaller metal fines. Preferably, eight to ten gallons per minute are sent to two centrifugal separators by diaphragm pump 38 at a pressure of 60 to 100 pounds per square inch and most preferably 80 to 90 pounds per square inch. Centrifugal separators 80 are preferably inverted, high-speed, fluid-driven centrifugal separators, as shown in FIG. 4. They have no filter media or filter cartridges; filtrate is simply forced to the interior surface 82 of shroud 84. There is no restriction of flow until the shroud is nearly full of particulate.

To achieve sufficient separation of fines down to one micron or less, the separator must be spun with sufficient thrust to begin to separate or partially separate the synthetic or semisynthetic coolant into its constituents. If the trust is too much, turbulence will result that prevents the centrifugal settling of the fines. Operation within the pressure and flow rate ranges specified above will produce appropriate thrust.

At the bottom of centrifugal separator 80 are two or more jet nozzles 90 that issue jets of coolant from separators 80. When the aperture of jet nozzles 90 are between 1.3 and 2.0 millimeters in diameter, and separators 80 are operating within the pressure ranges defined above, the nozzles will emulsify the partially separated coolant constituents, restoring them to usable condition as they enter the clean coolant compartment 76. From clean coolant compartment 76, the coolant exists through outlet 38 for further use. The emulsifying effect of jet nozzles 90 on the partially separated constituents enables the relatively high pressures to be applied to the coolant entering centrifugal separator 80. Without the higher pressure, the smallest metal fines would be separated. Furthermore, the portion of the reconditioned, cleaned coolant that exits clean coolant compartment 76 and mixes with the coolant from coalescer 50 will run through separator 80 again. The multiple passes made by the coolant further assures that the smallest fines are removed.

In the preferred mode the centrifugal separators 80 follow the coalescer 50. However, it will be seen that the order can be reversed, with the separator coming first and being followed by the coalescer.

A stablilizer 96 can be included with apparatus 10 that injects a measured quantity of biocide or other bacteria-killing or bacteria growth-inhibiting substance. Stabilizer 96 preferably disperses biocide onto floating oil through a pipe 98 to kill bacteria in the oil and thereby prevent the oil from becoming rancid.

In use, apparatus 10 is placed in a facility that has a quantity of coolant to be cleaned or conditioned. Service air at typical pressures around 80 pounds per square inch are connected to first and second pumps 36, 38. A line to the source of coolant to be cleaned is connected to inlet 26 and a second line run from outlet 30 to a tank for storing the fresh coolant supply. Next apparatus 10 is started. Pumps 36, 38 circulate coolant through filter 40 to remove larger particulate, then coalescer 50 agglomerates tramp oils so that skimmer 56 can transfer them to reservoir 64. The partially-cleaned coolant is then pumped to separator 80, along with some fully-cleaned coolant from clean coolant compartment. The smaller particulate is cnetrifugally separated and the cleaned coolant issued through jet nozzles 90 to emulsify any partially separated coolant constituents. The reconditioned coolant is then issued through outlet 30. If desired, a biocide can be incorporated into the process performed by apparatus 10 to stabilize the oils that are removed from coolant by skimmer 56 or to be added to the coolant to prevent bacteria from growing in oils that infuse the cleaned coolant when ready for reuse.

It will be apparent to those skilled in the art that many changes and substitutions can be made to the prefered embodiment herein described without departing from the spirit and scope of the present invention as defined by the appended claims.

What is claimed is:

1. Apparatus for cleaning water-based coolant, said coolant being composed of at least two constituents, said coolant containing particulate and maybe containing oils, said apparatus comprising:
   means for agglomerating said oils of said coolant so that said agglomerated oils rise to the surface of said coolant;
   means formed in said apparatus for drawing coolant from below the surface to which said agglomerated oils have risen;
   means for centrifuging said drawn coolant received from said drawing means so that said particulate is separated from said coolant, said centrifuging means having sufficient thrust to partially separate said coolant into said at least two constituents without turbulence; and
   means in fluid communication with said centrifuging means for emulsifying said partially separated constituents.

2. The apparatus as recited in claim 1, wherein said emulsifying means further comprises at least one jet nozzle receiving said partially separated constituents, said jet nozzle having an opening dimensioned to emulsify said at least two partially separated constituents before said coolant is discharged from said apparatus.

3. The apparatus as recited in claim 1, wherein said emulsifying means further comprises at least one jet nozzle receiving said partially separated constituents, said jet nozzle having an opening in the range 1.3 to 2.0 millimeters.

4. The apparatus as recited in claim 1, wherein said centrifuging means is an inverted, hydraulicly-driven centrifuge.

5. The apparatus as recited in claim 1, wherein said coolant may contain "tramp" oils and further comprising means for stabilizing said tramp oils in said coolant.

6. The apparatus as recited in claim 1 further comprising
   means for skimming said agglomerated oils from the surface of said coolant.

7. The apparatus as recited in claim 1, further comprising particulate filter means for removing at least a portion of said particulate, said filter means preceding said centrifuging means.

8. The apparatus as recited in claim 1, further comprising a wire-mesh filter dimensioned for removing at least a portion of said particulate, said at least a portion including particulate at least 200 microns in size, said filter preceding said coagulating means.

9. Apparatus for removing particulate and tramp oil from water-based coolant, said coolant being composed of at least two constituents, said apparatus comprising:
   filter means for removing at least a portion of said particulate;
   means for agglomerating said tramp oils so that said tramp oils rise to the surface;
   means for skimming said agglomerated tramp oils from the surface of said coolant;
   means for centrifuging said coolant received from said agglomerating means and said filtering means so that said particulate is separated from said coolant, said centrifuging means having sufficient thrust to partially separate said coolant into said at least two constituents; and
   means in fluid communication with said centrifuging means for emulsifying said at least partially separated constituents before said coolant is discharged from said apparatus.

10. The apparatus as recited in claim 9, further comprising pump means for delivering a preselected flow rate of coolant to said centrifuging means at a preselected pressure.

11. The apparatus as recited in claim 9, further comprising double diaphragm pump capable of delivering preselected flow rate of coolant to said centrifuging means at a preselected pressure.

12. The apparatus as recited in claim 9, wherein said centrifuging means further comprises an inverted, fluid driven centrifugal separator.

13. The apparatus as recited in claim 9, wherein said centrifuging means further comprises a centrifugal separator and said emulsifying means further comprises at least one nozzle attached to said separator through which said coolant issues from said centrifuging means.

14. Apparatus for removing particulate and tramp oil from water-based coolant, said coolant being composed of at least two constituents, said apparatus comprising:

first pump means for pumping said coolant into said apparatus filter means positioned to receive said coolant from said first pump means, said filter mean for removing at least a portion of said particulate;

means for agglomerating said tramp oils so that said tramp oils rise to the surface of said coolant, said agglomerating means receiving said coolant from said filter means;

means for skimming said agglomerated tramp oils from the surface of said coolant;

means for centrifuging said coolant received from said agglomerating means so that said particulate is separate from said coolant, said centrifuging means having sufficient thrust to partially separate said coolant into said at least two constituents;

second pumping means for pumping coolant to said centrifuging means at a preselected flow rate and preselected pressure; and means in fluid communication with said centrifuging means for emulsifying said at least partially separated constituents before said coolant is discharged from said apparatus.

15. The apparatus as recited in claim 14, wherein said filter means further comprises a stainless steel mesh filter.

16. The apparatus as recited in claim 14, wherein said first and second pumping means are double diaphragm air pumps.

17. The apparatus as recited in claim 14, further comprising means for stabilizing tramp oils in said coolant.

18. The apparatus as recited in claim 14, wherein said centrifuging means comprises at least one inverted, fluid-driven centrifugal separators.

19. The apparatus as recited in claim 14, wherein said agglomerator is an angular-cut, polymeric coalescer.

* * * * *